United States Patent Office 2,725,759
Patented Dec. 6, 1955

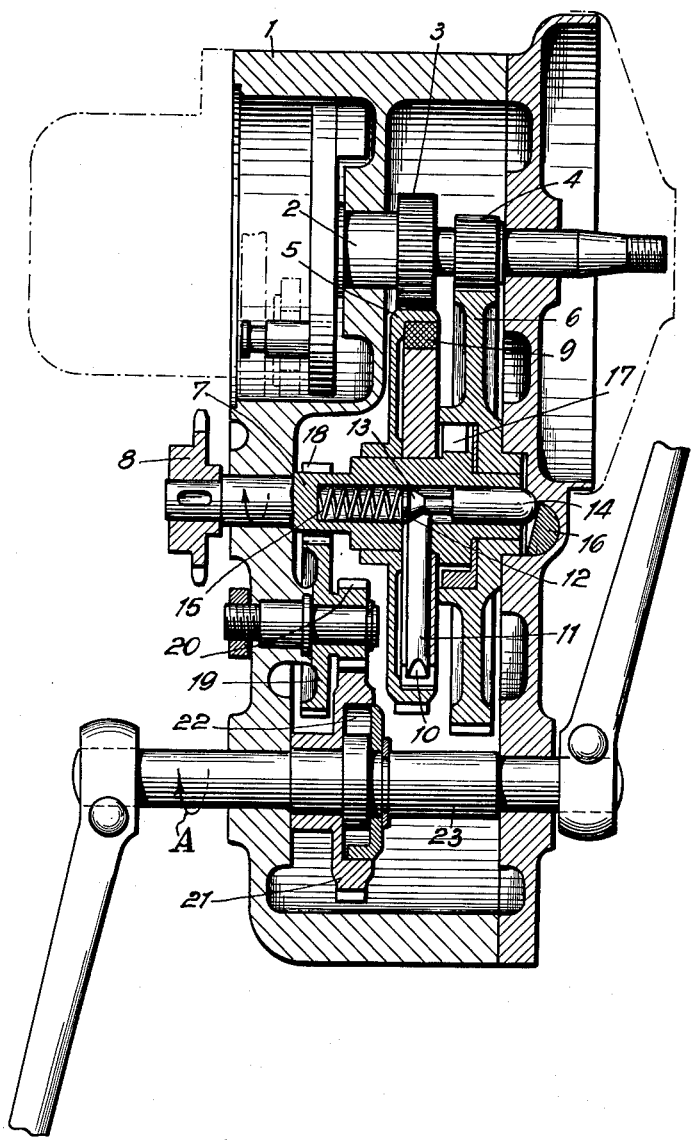

2,725,759

VARIABLE RATIO POWER TRANSMISSION GEAR

Alfred Kreidler, Stuttgart, Germany

Application December 1, 1951, Serial No. 259,339

Claims priority, application Germany December 7, 1950

3 Claims. (Cl. 74—368)

The present invention relates to improvements in variable speed power transmission gearing.

An object of the present invention is to provide a variable speed transmission gearing particularly suitable for application to bicycles or motor cycles having the usual pedal-operated drive and provided with an auxiliary engine.

A further object of the invention is to provide a gear transmission by which the engine of a cycle or motor cycle provided with a pedal-operated propulsion means can be started from the pedals.

A further object is to provide a gear transmission which will allow the cycle or motor cycle to overrun the engine when the vehicle is travelling at a greater speed than it would be when driven by the engine, as for instance in running downhill.

The drawing shows by way of example the application of the invention to a two speed gear mechanism for an engine-assisted pedal cycle, in sectional plan view.

The crank shaft 2 of the engine is mounted in the gear casing. Machined on to the shaft are two pinions 3 and 4 for the high and low speed transmission gear respectively. The pinion 3 meshes with a wheel 5 and the pinion 4 with a wheel 6, which gear wheels 5 and 6 are rotatably mounted on the driven shaft 7 on which is keyed on the outside of the casing 1 a sprocket wheel 8 for transmitting the drive to the rear wheel of the cycle or vehicle by means of a chain.

The smaller gear wheel 5 for the high gear, giving a high speed transmission ratio to the driven shaft 7, can be coupled with the driven shaft 7 by means of an expanding ring clutch element 9 which engages the inner surface of the flanged rim of the wheel 5. This ring is normally held expanded by its ends being forced apart by a pin 11 which is provided with an inclined surface 10. This pin abuts with a second inclined surface 12 at its inner end against a conical surface 13 of a thrust pin 14 guided in a central bore of the shaft 7, the pin being under the action of a compression spring 15. A shaft 16 having a flattened end which is connected with an actuating handle (not shown), serves to disengage the expanding clutch and free the wheel 5 from the shaft 7 on which it is mounted, by compressing the spring 15.

The gear wheel 6 for the low gear, giving a lower ratio of speed transmission to the driven shaft 7, is connected with the driven shaft 7 through a free wheel clutch 17 in such a manner that the driven shaft is coupled to the engine through this free wheel clutch in one direction of rotation only, and no power can be transmitted to the engine from the shaft 7 in this direction through the free wheel clutch 17.

The driven shaft 7 has a further fixed pinion 18 on it with which the wheel 19 of a reduction gear 19, 20 meshes. The toothed rim 21 of a second free wheel clutch 22 is in engagement with the wheel 20. This clutch 22 transmits any revolution of the pedal shaft 23 taking place in the direction of the arrow A, which shaft 23 is also mounted in the casing 1, to the reduction gear 19, 20, and thence to the shaft 7.

By this construction, the following operative conditions may be obtained:

(a) Pedal drive: The expanding clutch 9—15 is disengaged by operation of the shaft 16. The revolutions of the pedal shaft 23 are transmitted through the free wheel clutch 22, 21, the reduction gear 20, 19, and the pinion 18 to the driven shaft 7 and from there to the sprocket wheel 8. Since the clutch 9—15 is disengaged and the free wheel clutch cannot transmit any power in this direction, the gear wheels 3—6 and the engine are at a standstill.

(b) To start the engine: The expanding clutch 9—15 is first engaged by allowing free action of the spring 15. The revolution of the pedal shaft 23 is transmitted by the free wheel clutch 22, 21, the reduction gear 20, 19, the pinion 18, the driven shaft, the clutch 15—9, and the gear connection 5, 3 to the crank shaft 2, to start the engine. When the engine has started, the power transmission occurs in a reverse direction to the driven shaft 7 and the chain wheel 8. The reduction gear 19, 20 and the rim 21 rotate therewith, and the latter, owing to the free wheel clutch 22, overruns the revolution of the pedal shaft 23, thus permitting the driver to cease pedalling. The gear wheels 4, 6 rotate therewith but transmit no load, the driven shaft 7, owing to the free wheel clutch 17, overrunning the gear wheel 6.

(c) Driving in high gear: The power transmission is the same as after the starting of the engine.

(d) Driving at low speed: For this purpose the clutch 9—15 can be disengaged during driving. Then the power is transmitted from the crank shaft 2 of the engine by the gear connection 4, 6 and the free wheel clutch 17 to the driven shaft 7 and the chain wheel 8. The wheels 3 and 5 rotate therewith at no-load transmission, the wheel 5 rotating faster than the shaft 7.

(e) Driving downhill: The connection is the same as under (d). The engine may be throttled, and the speed of the driven shaft 7 overruns if necessary the gear wheel 6.

From the above, it follows that de-clutching is unnecessary before changing gears, thus obviating shocks to the gear mechanism and engine due to faulty manipulation.

I claim:

1. In a motor driven bicycle, a motor, a motor crankshaft, a casing, a change speed gearing of the said motor disposed in the said casing, a driven shaft disposed parallel to and spaced apart from the said crank-shaft in the said casing, said change speed gearing comprising a plurality of sets of meshing gears of different ratio-of-speed transmission for selective driving of said bicycle, each of the said sets comprising a driving gear and a driven gear, each driving gear being formed as a toothed rim on the said crank-shaft, each driven gear being rotatably mounted on the said driven shaft, a sprocket wheel keyed to the said driven shaft and adapted to drive the rear wheel of the said bicycle, a pedal shaft, a pedal gear rotatably mounted on the said pedal shaft, means for driving the said driven shaft selectively from the said pedal shaft or the said motor crank-shaft including means responsive to the rotation of the said pedal shaft in a forward direction to initiate operation of the said motor, the improvement comprising a ring clutch element disposed between the said driven shaft and the smallest of the said driven gears and a one-way clutch disposed between said driven shaft and another driven gear, both, said ring clutch element and said one-way clutch being included in said means for driving the said driven shaft.

2. The bicycle, as set forth in claim 1 in which said means responsive to the rotation of the said pedal shaft comprises a free wheel clutch between the said pedal shaft and the said pedal gear rotatably mounted thereon.

3. In a motor driven bicycle, a motor, a motor crank-shaft, a casing, a change speed gearing of the said motor disposed in the said casing, a driven shaft disposed parallel to and spaced apart from the said crank-shaft in the said casing, a first pinion and a second pinion of smaller diameter than that of the said first pinion, both said pinions formed integrally on the said crank-shaft, a first gear meshing with the said first pinion and a second gear meshing with the said second pinion and said first gear being smaller than said second gear, both said gears being rotatably mounted on the said driven shaft, a sprocket wheel keyed to the said driven shaft and adapted to drive the rear wheel of the said bicycle, a pedal shaft, a pedal gear rotatably mounted on the said pedal shaft, means for driving the said driven shaft selectively from the said pedal shaft or the said motor crank-shaft including means responsive to the rotation of the said pedal shaft in a forward direction to initiate operation of the said motor, the improvement comprising a one-way clutch disposed between the said driven shaft and the said second gear, a ring clutch element disposed between the said driven shaft and the said first gear, both, said one-way clutch and said ring clutch element being included in said means for driving said driven shaft, and a free wheel clutch between the said pedal shaft and the said pedal gear rotatably mounted thereon, said free wheel clutch being included in said means responsive to the rotation of the said pedal shaft.

References Cited in the file of this patent

UNITED STATES PATENTS

| | | |
|---|---|---|
| 432,600 | Clark | July 22, 1890 |
| 899,746 | Levedahl | Sept. 29, 1908 |
| 1,751,809 | Glisch | Mar. 25, 1930 |
| 2,191,609 | Dodge | Feb. 27, 1940 |
| 2,212,279 | Steinlein | Aug. 20, 1940 |
| 2,238,208 | Anthony | Apr. 15, 1941 |